(12) United States Patent
Sedillo

(10) Patent No.: US 6,413,041 B1
(45) Date of Patent: Jul. 2, 2002

(54) METHOD AND APPARATUS FOR CLOSING HOLES IN SUPERALLOY GAS TURBINE BLADES

(75) Inventor: Patrick Martin Sedillo, Orlando, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 09/631,095

(22) Filed: Aug. 2, 2000

(51) Int. Cl.[7] ............................................... F03B 11/00
(52) U.S. Cl. ......................................... 415/115; 416/97
(58) Field of Search ................................ 416/232, 224, 416/235, 236 R, 231 R, 231 B, 233, 97 R, 92

(56) References Cited

U.S. PATENT DOCUMENTS

| | | |
|---|---|---|
| 3,626,568 A | 12/1971 | Silverstein et al. |
| 3,635,587 A * | 1/1972 | Giesman et al. ............ 416/97 |
| 3,982,851 A | 9/1976 | Andersen et al. |
| 4,416,321 A | 11/1983 | Goddard et al. |
| 4,953,777 A | 9/1990 | Griffith et al. |
| 5,111,570 A | 5/1992 | Baumgarten et al. |
| 5,545,010 A * | 8/1996 | Cederwall et al. .......... 416/145 |

* cited by examiner

Primary Examiner—F. Daniel Lopez
Assistant Examiner—Kimya N McCoy

(57) ABSTRACT

A sealing member that seals a core printout hole in a turbine blade of a combustion gas turbine engine includes a plug member and first and second leg members. The plug member is formed generally in a top hat configuration and is disposed in a cavity formed in the blade, the plug member being retained in the desired sealing position by the leg members. The plug member broadly serves the purpose of sealing the hole that is in communication with the cavity. The plug member includes a substantially planar plate that is disposed adjacent the internal first surface of a wall of the turbine blade and a retention member that is received in the hole. The first and second leg members are fixedly mounted, such as by welding, on the plug member and are at least partially disposed adjacent and overlap a second opposite and external surface of the wall.

21 Claims, 3 Drawing Sheets

METHOD AND APPARATUS FOR CLOSING HOLES IN SUPERALLOY GAS TURBINE BLADES

BACKGROUND OF THE INVENTION

1. Field of the Invention

The present invention relates generally to gas turbine blades and, more particularly, to hollow gas turbine blades formed by a casting operation that leaves core printout holes therein. Specifically, the invention relates to a method and apparatus for closing core printout holes in superalloy gas turbine blades.

2. Description of the Related Art

Turbine blades are employed in different regions of combustion gas turbine engines. As is known in the related art, such combustion gas turbine engines typically include a compressor section, a combustor section, and a turbine section. Air is drawn into the engine and compressed by the compressor section, with fuel being mixed into the compressed air and the fuel/air mixture being combusted in the combustor section. The hot combusted gases then flow past the turbine section and thereafter exit the engine.

The turbine section of the engine typically includes a plurality of blades that are mounted on a common rotating shaft. The turbine section each additionally includes one or more stators having a plurality of non-moving vanes or blades that cooperate with the moving blades mounted on the rotating shaft to derive mechanical power from high velocity gases.

Since the blades of the turbine section, both moveable and stationary, operate in a high temperature environment, such turbine blades are typically formed in a casting operation to include a hollow cavity. The cavity receives cooling air during operation of the combustion engine to provide a cooling effect to the blades and to control the operating temperature thereof. The hollow cavity is cast into each turbine blade by providing a core within the blade mold. The core is retained within the mold by one or more ceramic rods that extend from the core to the inner surface of the mold itself for retaining the core in a given position within the mold. A molten alloy is then poured into the mold with the core disposed therein, whereby the core prevents the flow of the molten alloy within desired regions of the mold and ultimately results in a hollow region or cavity within the finished turbine blade that can receive the beneficially cooling air therein.

During the casting operation, however, the ceramic rods that retain the core in the desired position within the mold likewise themselves prevent the flow of the molten alloy such that the finished turbine blade additionally and undesirably includes one or more core printout holes resulting from the ceramic rods. Such core printout holes must be sealed prior to use of the turbine blade, otherwise the cooling air introduced into the hollow region or cavity of the turbine blade will undesirably flow out of the printout hole without providing the needed beneficial cooling effect to the turbine blade.

Previous methods and apparatuses employed to seal such core printout holes have met with only limited success due to the difficulty of attaching or bonding a seal strongly enough to the turbine blade to withstand the typical operating environment. As is known in the relative art, such blades typically are manufactured out of a "superalloy" that typically is of a nickel base that is alloyed with other materials such as aluminum, titanium, chromium, and other materials in various combination and proportions, although numerous other alloys can be used for the manufacture of turbine blades. Such superalloys typically include nickel aluminide intermetallic crystals that are extremely brittle and are precipitated within a solid solution that makes up the turbine blade. Welding of such nickel-based superalloy materials is extremely difficult and often results in cracking and microfissuring due to strain age and liquation cracking. A need thus exists for a method of sealing core printout holes whereby a sealing member is sufficiently strongly and sealingly mounted on the turbine blade while avoiding the necessity of applying a weld directly to the superalloy turbine blade.

SUMMARY OF THE INVENTION

In accordance with the foregoing, an aspect of the present invention is to provide a sealing member that seals a core printout hole in a turbine blade of a combustion gas turbine engine. The sealing member includes a plug member and first and second leg members. The plug member is formed generally in a top hat configuration and is disposed in a cavity formed in the blade, the plug member being retained in the desired sealing position by the leg members. The plug member broadly serves the purpose of sealing the hole that is in communication with the cavity. The plug member includes a substantially planar plate that is disposed adjacent the internal first surface of a wall of the turbine blade and a retention member that is received in the hole. The first and second leg members are fixedly mounted, such as by welding, on the plug member and are at least partially disposed adjacent and overlap a second opposite and external surface of the wall.

Another aspect of the present invention is to provide a sealing member for sealing a hole in a wall of a blade of a combustion gas turbine engine, the blade being formed with a cavity, the hole being in communication with the cavity, the general nature of which can be stated as including a plug member having a plate and a retention member, the plate being structured to be disposed at least partially within the cavity and at least partially adjacent a first surface of the wall, the retention member extending from the plate and being structured to be disposed at least partially within the hole, and a first leg member attachable to the plug member, the first leg member being structured to at least partially overlap a second surface of the wall, the second surface being opposite the first surface.

Still another aspect of the present invention is to provide a gas turbine engine, the general nature of which can be stated as including a compressor section, a combustor section, and a turbine section, the turbine section including at least a first blade, the at least first blade having a wall and being formed with a cavity and a hole, the hole extending through the wall and being in communication with the cavity, a sealing member being mounted on the at least first blade, the sealing member including a plug member and a first leg member, the plug member including a plate and a retention member, the plate being disposed at least partially within the cavity and at least partially adjacent a first surface of the wall, the retention member extending from the plate and being disposed at least partially within the hole, and the first leg member being attached to the plug member, the first leg member at least partially overlapping a second surface of the wall, the second surface being opposite the first surface.

Yet another aspect of the present invention is to provide a method of sealing a hole in a wall of a blade of a combustion gas turbine engine, the blade being formed with a cavity, the hole being in communication with the cavity, the general nature of which can be stated as including the steps of receiving a plug member in the cavity, the plug member having a plate and a retention member, positioning the plug member such that the plate is disposed at least partially within the cavity and at least partially adjacent a first surface of the wall, and such that the retention member is at least partially received in the hole, and attaching a first leg member to the plug member such that the first leg member at least partially overlaps a second surface of the wall, the second surface being opposite the first surface.

BRIEF DESCRIPTION OF THE DRAWINGS

The preferred of the embodiment of the invention, illustrative of the best mode in which Applicant has contemplated applying the principles of the invention, is set forth in the following description and is shown in the drawings and is particularly and distinctly pointed out and set forth in the appended Claims.

Similar numerals refer to similar parts throughout the specification.

DESCRIPTION OF THE PREFERRED EMBODIMENTS

Figure 1:
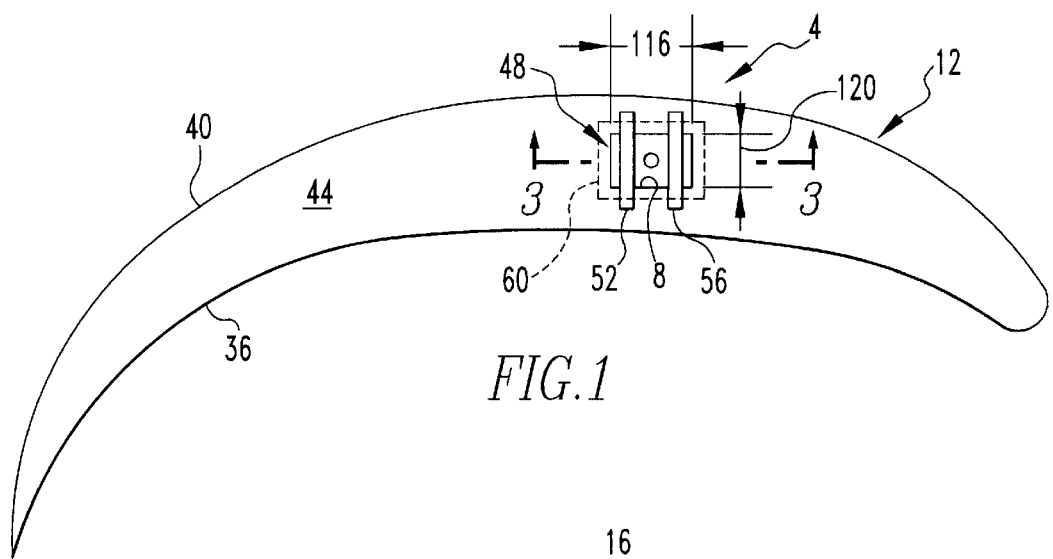
FIG. 1 is an end view of a turbine blade employing a sealing member in accordance with a first embodiment of the present invention.
Figure 2:
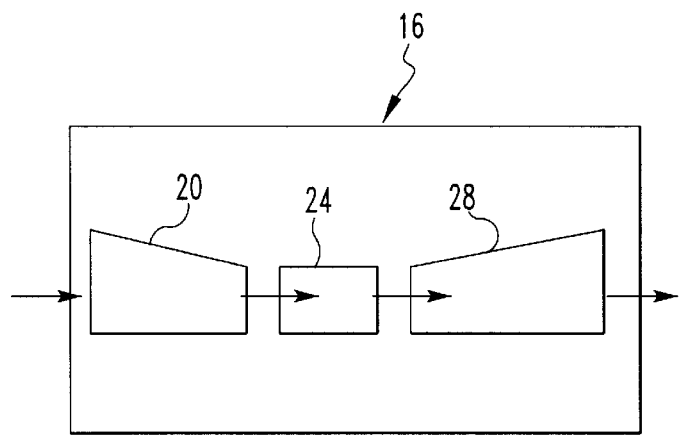
FIG. 2 is a schematic representation of a prior art combustion gas turbine engine into which the sealing member can be incorporated.
Figure 3:
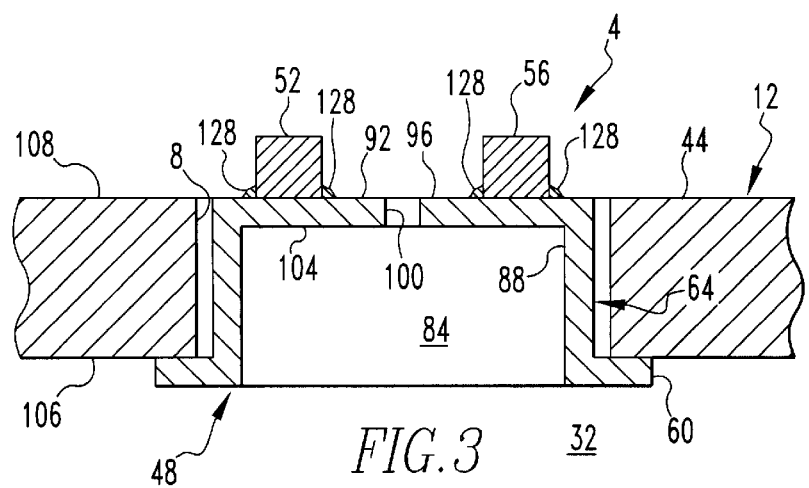
FIG. 3 is a sectional view as taken along line 3—3 of FIG. 1.
Figure 4:
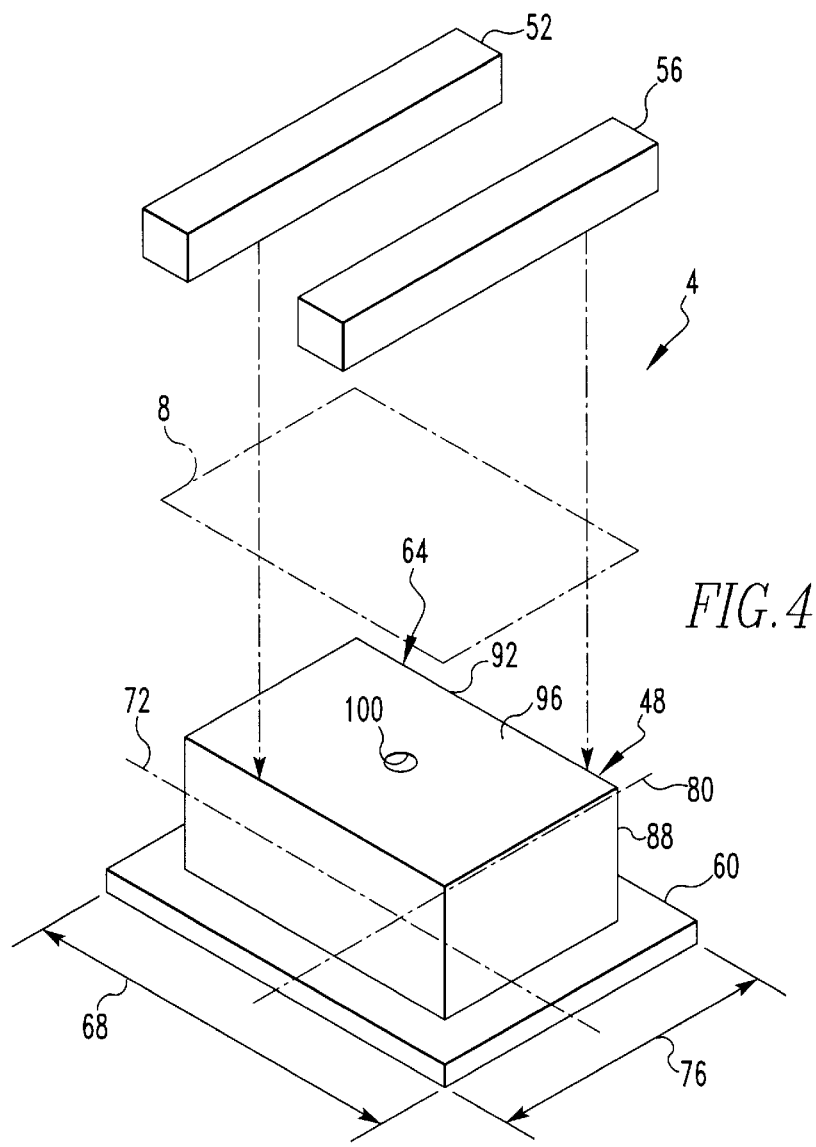
FIG. 4 is an exploded isometric view of the sealing member.

A sealing member in accordance with the present invention is indicated generally at the numeral 4 in FIGS. 1, 3, and 4. The sealing member 4 is employed to seal a hole 8 (FIGS. 1, 3, and 5) in a turbine blade 12 of a combustion gas turbine engine 16 (FIG. 2).

As is known in the relevant art, and is schematically depicted in FIG. 2, the engine 16 includes a compressor section 20, a combustor section 24, and a turbine section 28 in serial flow communication with one another. As is depicted by the arrows in FIG. 2, a quantity of air first enters the compressor section 20 where it is compressed. The compressed air thereafter flows into the combustor section 24 where it is mixed with fuel and ignited. The hot combustion gases thereafter flow from the combustor section 24 into the turbine section 28 where power is derived from the high velocity combustion gases.

As is known in the relevant art, the turbine section 28 includes a plurality of the blades 12 in various configurations that interact with the air flowing through the engine 16 during operation thereof. As described herein, the blades 12 are each formed with a hollow region or cavity 32 that beneficially receives cooling air therein in a known fashion for providing a cooling effect to the blades 12 and to the sealing member 4 during operation of the engine 16. While it is understood that in certain applications turbine section 28 may include one or more blades that are solid and are not formed with a cavity, the present invention is directed to blades 12 that are each formed with at least one cavity 32, and thus such blades 12 are depicted herein. It is further understood that where desired such blades 12 may be incorporated into the compressor section 20 of the engine 16.

As is best shown in FIG. 1, the blade 12 includes a concave wall 36 and a convex wall 40 over which the air flows in a known manner for the transfer work therebetween. The blade 12 terminates at one end at a tip wall 44 that faces out of the page of FIG. 1 and that is generally bounded by the concave and convex walls 36 and 40. The tip wall 44 is generally the radially outermost portion of the blade 12 with respect to the common rotating shaft (not shown) upon which the blades 12 are mounted. The cavity 32 is at least partially defined within the concave, convex, and tip walls 36, 40, and 44.

Figure 5:
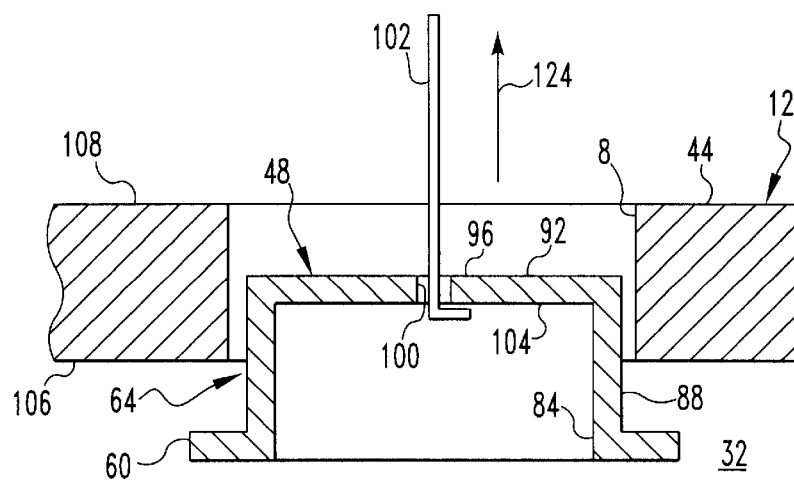
FIG. 5 is a view similar to FIG. 3, except showing a plug member of the sealing member being positioned with a tool.

The hole 8 is formed in the tip wall 44 of the blade 12. The hole 8 is formed, at least initially, by a ceramic rod of a core that is employed during the casting of the blade 12 to form the cavity 32. As is best shown in FIGS. 3 and 5, the hole 8 is in communication with the cavity 32. As will be set forth more fully below, the sealing member 4 advantageously seals the hole 8 to permit the cooling air that is introduced into the cavity 32 be retained therein for an appropriate period and to provide a beneficial cooling effect to the blade 12.

The sealing member 4 includes a plug member 48, a first leg member 52, and a second leg member 56. As will be set forth more fully below, the plug member 48 is sealingly received in the cavity 32 and the hole 8, and the first and second leg members 52 and 56 retain the plug member 48 in the aforementioned sealing position.

The plug member 48 includes a plate 60 and a retention member 64 (FIGS. 3–5). The plate 60 is a generally planar member having a length 68 as measured in a direction along a first axis 72, and a width 76 as measured in a direction along a second axis 80, with the first and second axes 72 and 80 being perpendicular to one and other. While the plate 60 is depicted herein as having a substantially rectangular perimeter with the length 68 being greater of the width 76, it is understood that the plate 60 can be of numerous other configurations appropriate to the specific needs of the particular application without departing from the present invention. For instance, the plate 60 may be of a square rectangular configuration, of a non-rectangular arcuate configuration such as an ellipse or an oval, or of other appropriate configurations as needed.

As is best shown in FIGS. 3 and 5, the plate 60 is a generally planar rectangular member that is formed with a substantially rectangular opening 84 about which the retention member 64 is mounted. As such, it can be seen that the plate 60 is configured generally in the nature of a flange that protrudes outwardly within a plane from the retention member 64. It is understood, however, that in other applications the plate 60 may be a continuous member that is not formed with the opening 84 without departing from the present invention.

With reference to FIGS. 3–15, the retention member 64 includes a frame 88 and a panel 92. The frame 88 is connected with the plate 60 adjacent the opening 84 and thus is of a substantially hollow rectangular cross section when viewed through a plane parallel with the plane of the plate 60. It is understood that the plug member 48, which includes the plate 60, the frame 88, and the panel 92, can be and preferably is integrally formed out of a single piece of material and thus is monolithic and substantially free of joints therein.

The panel 92 is a substantially planar member that is peripherally attached to the frame 88 opposite the connection of the frame 88 with the plate 60. The panel 92 includes a substantially planar attachment surface 96 defined at the upper region thereof and is formed with a substantially cylindrical cooling bore 100 that is centrally disposed thereon. The attachment surface 96 is the portion of the plug member 48 to which the first and second leg members 52 and 56 are preferably attached, although the first and second leg members 52 and 56 potentially may be alternatively or additionally attached to other portions of the plug member 48, such as the frame 88. The cooling bore 100 is employed in mounting the sealing member 4 on the blade 12 and additionally provides a beneficial cooling effect to the sealing member 4 and to the blade 12.

With regard to installing the sealing member 4 on the blade 12 (FIG. 5), it is seen that the cooling bore 100 is sized and positioned to receive therein an appropriate tool 102 having a hook or a number of extensible arms that are structured to grasp the panel 92 from an underside 104 thereof. More specifically, in installing the sealing member 4 on the blade 12, the hook or other grasping structure of the tool 102 is received through the cooling bore 100 and against the underside 104 of the panel 92. In such a fashion, the tool 102 supports the plug member 48 from only the central region thereof.

As is best shown in FIGS. 3 and 5, the tip wall 44 includes a substantially planar first surface 106 that is generally internal to the blade 12 and at least partially defines the cavity 32. The tip wall 44 additionally includes a second surface 108 that is opposite the first surface 106 and is generally external to the blade 12. In positioning into the cavity 32 and the hole 8 the plug member 48 that is mounted on the tool 102, it is desired to maneuver the plug member 48 from the external regions of the blade 12, through the hole 8 in a direction from the second surface 108 toward the first surface 106, and into the cavity 32. Once the plug member 48 is received in the cavity 32, the plug member 48 can be further maneuvered such that the retention member 64 is received in the hole 8 and the plate 60 is received against the first surface 106 (FIGS. 3 and 5).

It can be appreciated from FIGS. 1 and 3–5 that the perimeter dimensions of the plate 60 are larger than those of the hole 8. More specifically, the hole 8, as depicted herein, is substantially rectangular and is of a hole length 116 (FIG. 1) and a hole width 120. As is further depicted herein the hole length 116 is greater than the hole width 120. It can be seen, however, that the hole length 116 need not strictly be greater than the hole width 120 to practice the present invention, and it can further be seen that that the hole 8 can be of numerous other non-circular configurations.

It is understood that the core printout hole that initially results from the ceramic rod which holds the core within the casting mold typically is of a circular or oval cross section. In practicing the present invention, therefore, the initially formed core printout hole is ground or otherwise worked to be in the form of the rectangular hole 8. In this regard, it is understood that the configuration of the hole 8 and the plug member 48 depicted herein are merely an example of one of many different shapes and configurations that may be possible without departing from the present invention.

By way of further example regarding the hole 8 and the plug member 48, while the length 68 of the plate 60 is greater than the hole length 116, it can be seen that the width 76 of the plate 60 is less than the hole length 116. It can thus be seen that the plug member 48, while supported on the tool 102, can be inserted into the hole 8 in the direction of the first axis 72. With some maneuvering of the plug member 48 by the tool 102, and more specifically by rotating and translating the plug member 48 as needed with the plug member 48 received in the cavity 32 and. supported by the tool 102, the retention member 64 can be aligned with the hole 8.

When the retention member 64 is aligned with the hole 8 (FIG. 5), the retention member 64 can be received in the hole 8 by lifting upwardly on the tool 102 as is depicted by the arrow 124, thereby lifting the plug member 48 into the sealing position that is depicted in FIG. 3. In such a sealing position, the plate 60 of the plug member 48 rests flush against the first surface 106 of the tip wall 44, and the retention member 64 is received in the hole 8 with preferably minimal space between the frame 88 and the blade 12. In this regard, it is understood that the spaces shown between the frame 88 and the blade 12 in FIGS. 3 and 5, are exaggerated for the purpose of clarity.

When the plug member 48 is in the sealing position, the plate 60 preferably overlaps the first surface 106 about the entire perimeter of the hole 8. It is understood, however, that in other applications it may be appropriate for the plate 60 to overlap the first surface 106 along less than the full perimeter of the hole 8 without departing from the present invention.

With the plug member 48 in the sealing position depicted in FIG. 3, the attachment surface 96 preferably is advantageously flush with the second surface 108 of the tip wall 44 to promote continuity of the air flow across the second surface 108 and the attachment surface 96, as well as to retain the plug member 48 in the sealing position when the first and second leg members 52 and 56 are attached thereto. More specifically, once the plug member 48 is positioned in the sealing position in which the plate 60 is disposed against the first surface 106, and the attachment surface 96 is flush with the second surface 108, the first and second leg members 52 and 56 are each fixedly attached to the attachment surface 96 of the plug member 48. Such attachment is preferably performed by welding, although it is understood that alternate attachment methodologies may be employed depending upon the particular needs of the specific application.

As can be seen in FIG. 3, a weld bead 128 extends along each juncture between the first and second leg members 52 and 56 and the attachment surface 96. The weld beads 128 advantageously extend only along the attachment surface 96 and do not extend beyond the attachment surface 96 onto the second surface 108 of the tip wall 44.

As can be seen in FIG. 1, when the first and second leg members 52 and 56 are mounted on the attachment surface 96, the ends of each of the first and second leg members 52 and 56 at least partially lap over the second surface 108 of the tip wall 44. The first and second leg members 52 and 56 thus resist the plug member 48 from falling away from the tip wall 44, out of the sealing position, and into the cavity 32 when the engine 16 is not in operation. On the other hand, since the plate 60 is disposed adjacent the first surface 106 and has perimeter dimensions greater than that of the hole 8, the plate 60 retains the plug member 48 in the sealing position and resists movement of the plug member 48 away from the tip wall 44 in the direction of the arrow 124 when the engine 16 is in operation. In this regard, inasmuch as the tip wall 44 is generally the radially outermost portion of the blade 12 with respect to the common rotating shaft upon which the blade 12 is mounted, the plug member 48 experiences centripetal acceleration in the same direction as the arrow 124 when the engine 16 is in operation. The plate 60 and the first and second leg members 52 and 56 thus retain the plug member 48 in the sealing position depicted in FIG. 3 by resisting movement of the plug member 48 in the direction of the arrow 124 or in a direction opposite thereto which retains the sealing member 4 in its desired position both during operation of the engine 16 and during periods of non-operation.

While the sealing member 4 depicted herein includes the first and second leg members 52 and 56 being oriented substantially parallel with the second axis 80 and spaced from the cooling bore 100, it is understood that in other applications the sealing member 4 may include a greater or lesser number of leg members, and additionally or alternatively may employ leg members that are oriented parallel with the first axis 72 or are orientated in other directions. Such alternate configurations of the sealing member 4 may be appropriate if added stiffness is desired for the panel 92 during operation of the engine 16, as well as for other purposes.

The tool 102 is removed from the cooling bore 100 at an appropriate time, such as after the outermost weld beads 128 have been applied between the attachment surface 96 and the first and second leg members 52 and 56. In this regard, it may be appropriate to first apply the outermost weld beads 128, i.e., those opposite the cooling bore 100, and to remove the tool 102 from the cooling bore 100 prior to applying the weld beads 128 that will be adjacent the cooling bore 100.

Once the tool 102 has been removed from the cooling bore 100, and when the engine 16 is in operation, the cooling air that is supplied to the cavity 32 can flow out of the cooling bore 100 at an appropriate rate to provide an advantageous cooling effect to the sealing member 4 and to the blade 12. It is understood in this regard that the cooling bore 100 need not be of a cylindrical configuration, but rather can be of any shape that is appropriately sized and shaped to accommodate the tool 102 therein during installation, and to permit sufficient flow of the cooling air therethrough to provide any appropriate cooling effect desired to the sealing member 4.

By providing the first and second leg members 52 and 56 that are fixedly attached only to the plug member 48, the necessity of attempting to apply a weld directly to the blade 12, which is manufactured out of a brittle nickel aluminide that is extremely difficult to successfully weld upon, is advantageously avoided. In this regard, the components of the sealing member 4 preferably are manufactured out of high temperature materials that are suited to the operating environment of the engine 16, yet can be successfully welded using conventional methods. Such appropriate materials that can be used to manufacture the sealing member 4 would include a material such as the alloy sold under the name HASTELLOY® X by Haynes International, Inc., of Kokomo, Ind., USA, although other appropriate materials of the type known by those skilled in the relevant art may be employed without departing from the present invention.

In this regard, it is understood that the blade 12 is a directionally solidified component and thus is relatively difficult to successfully weld. On the other hand, HASTELLOY® X is an equi-axed material, such as that resulting from a conventional casting operation, and thus is relatively easier to weld than the directionally solidified blade 12. The ability to seal the hole 8 by applying welds solely to the sealing member 4 thus greatly simplifies the sealing of the hole 8 and provides a sealing member 4 that is retained in the sealing position during operation of the engine 16 by the plate 60 and is retained when the engine 16 is not in operation by the first and second leg members 52 and 56.

Figure 6:
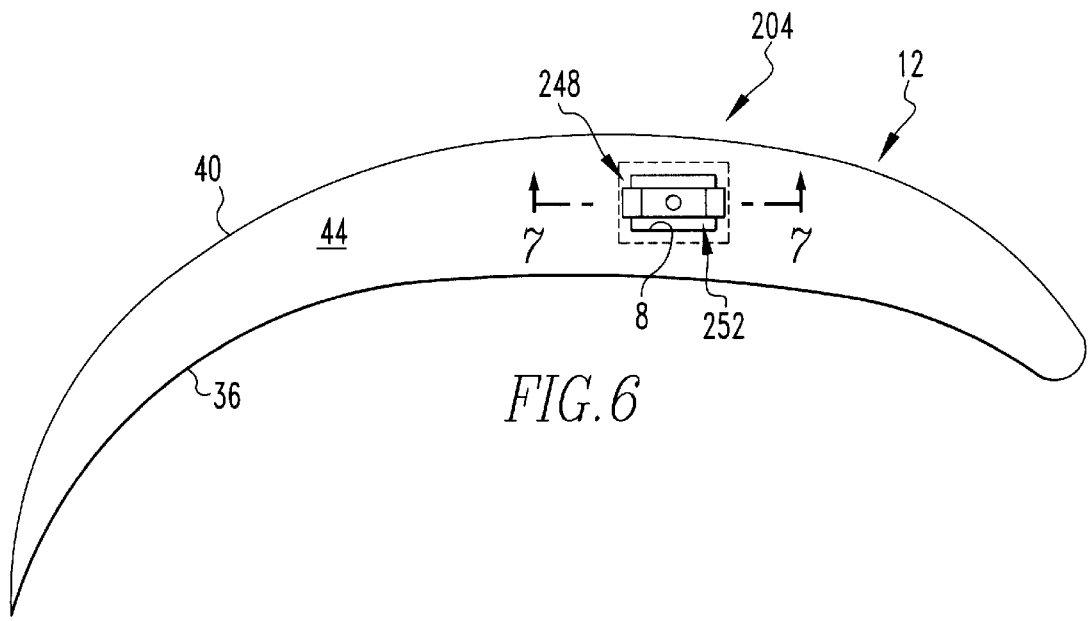
FIG. 6 is an end view of a turbine blade employing a sealing member in accordance with a second embodiment of the present invention.
Figure 7:
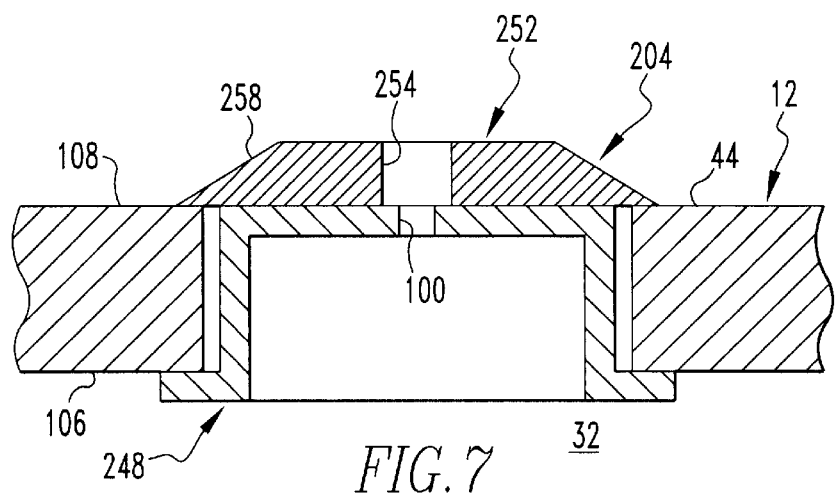
FIG. 7 is a sectional view as taken along line 7—7 of FIG. 6.

A second embodiment of a sealing member 204 in accordance with the present invention is indicated generally in FIGS. 6 and 7. The sealing member 204 is similar to the sealing member 4 but employs only a single leg member 252 that is centrally disposed on the plug member 248.

More specifically, the leg member 252 is formed with a centrally disposed thru bore 254 that is of a greater diameter than the cooling bore 300 of the plug member 248, with the thru bore 254 and the cooling bore 300 being axially aligned (FIG. 7) when the sealing member 204 is installed on the blade 12. Additionally, the leg member 252 has an outer surface 258 that is beveled for the purposes of reducing drag caused by the sealing member 204 during operation of the engine 16 and to reduce weight. Moreover, the leg member 252 is oriented on the plug member 248 transverse to the orientation of the first and second leg members 52 and 56 on the plug member 48.

The sealing member 204 illustrates that the leg member 252 can be of alternate configurations, can be beveled or curved, and can still retain the plug member 248 in the sealing position on the blade 12. It is understood that further variations of the leg member 252 and of the plug member 248 are possible without departing from the present invention.

While particular embodiments of the present invention have been described herein, it is understood that various changes, additions, modifications, and adaptations may be made without departing from the scope of the present invention, as set forth in the following Claims.

I claim:

1. A sealing member for sealing a hole in a wall of a blade of a combustion gas turbine engine, the blade being formed with a cavity, the hole being in communication with the cavity, the sealing member comprising:

a plug member having a plate and a retention member, the plate being structured to be disposed at least partially within the cavity and at least partially adjacent a first surface of the wall, the retention member extending from the plate and being structured to be disposed at least partially within the hole; and a discrete first leg member attachable to the plug member, the first leg member being structured to at least partially overlap a second surface of the wall, the second surface being opposite the first surface.

2. The sealing member as set forth in claim 1, in which the plate is substantially planar and has a length measured along a first axis and a width measured along a second axis.

3. The sealing member as set forth in claim 2, in which the length and width are non-equal.

4. The sealing member as set forth in claim 2, in which the plate is substantially rectangular.

5. The sealing member as set forth in claim 1, in which the retention member includes an attachment surface, the at least first leg member being attachable to the attachment surface.

6. The sealing member as set forth in claim 5, in which the retention member includes a panel and a frame, the panel being peripherally connected to the frame, the frame extending from the plate.

7. The sealing member as set forth in claim 6, in which a side of the panel opposite the plate is substantially planar, the attachment surface being opposite the plate.

8. The sealing member as set forth in claim 6, in which the frame is substantially rectangular in cross section.

9. The sealing member as set forth in claim 6, in which the panel is formed with a cooling bore.

10. The sealing member as set forth in claim 9, further comprising a second leg member attachable to the alignment surface, the second leg member being structured to be disposed adjacent the second surface of the wall.

11. The sealing member as set forth in claim 1, in which the plug member is an integrally formed monolithic one piece member.

12. The sealing member as set forth in claim 1, in which the first leg member has a surface that is at least partially one of beveled and curved.

13. A gas turbine engine comprising:
   a compressor section;
   a combustor section; and
   a turbine section;
   the turbine section including at least a first blade, the at least first blade having a wall and being formed with a cavity and a hole, the hole extending through the wall and being in communication with the cavity;
   a sealing member being mounted on the at least first blade, the sealing member including a plug member and a discrete first leg member attachable to the plug member;
   the plug member including a plate and a retention member, the plate being disposed at least partially within the cavity and at least partially adjacent a first surface of the wall, the retention member extending from the plate and being disposed at least partially within the hole; and
   the first leg member being attached to the plug member, the first leg member at least partially overlapping a second surface of the wall, the second surface being opposite the first surface.

14. The gas turbine engine as set forth in claim 13, in which the retention member includes a panel and a frame, the panel being peripherally connected to the frame, the frame extending from the plate and being at least partially received in the hole.

15. The gas turbine engine as set forth in claim 14, in which the plate is substantially planar and has a length measured along a first axis and a width measured along a second axis.

16. The sealing member as set forth in claim 15, in which the length and width are non-equal.

17. The sealing member as set forth in claim 15, in which the plate is substantially rectangular.

18. The gas turbine engine as set forth in claim 14, in which the panel includes an attachment surface, the at least first leg member being attached to the attachment surface, the attachment surface being at least partially substantially flush with the second surface of the wall.

19. A method of sealing a hole in a wall of a blade of a combustion gas turbine engine, the blade being formed with a cavity, the hole being in communication with the cavity, the method comprising the steps of:
   receiving a plug member in the cavity, the plug member having a plate and a retention member;
   positioning the plug member such that the plate is disposed at least partially within the cavity and at least partially adjacent a first surface of the wall, and such that the retention member is at least partially received in the hole; and
   attaching a first leg member to the plug member such that the first leg member at least partially overlaps a second surface of the wall, the second surface being opposite the first surface.

20. The method as set forth in claim 19, in which the retention member includes a panel and a frame, and in which the panel includes an attachment surface, in which the step of positioning the plug member includes the step of disposing the attachment surface substantially flush with the second surface of the wall.

21. The method as set forth in claim 19, in which the retention member is formed with a cooling bore, and in which the step of positioning the plug member includes the step of grasping the retention member through the cooling bore.

* * * * *